May 19, 1925.

F. MEYER

REFRIGERATING TANK

Filed Oct. 19, 1922     2 Sheets-Sheet 1

1,538,130

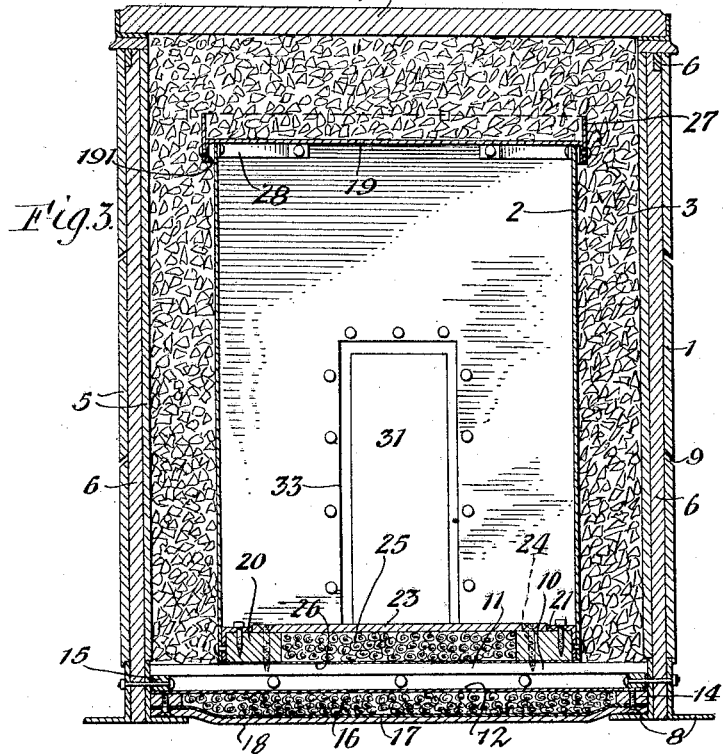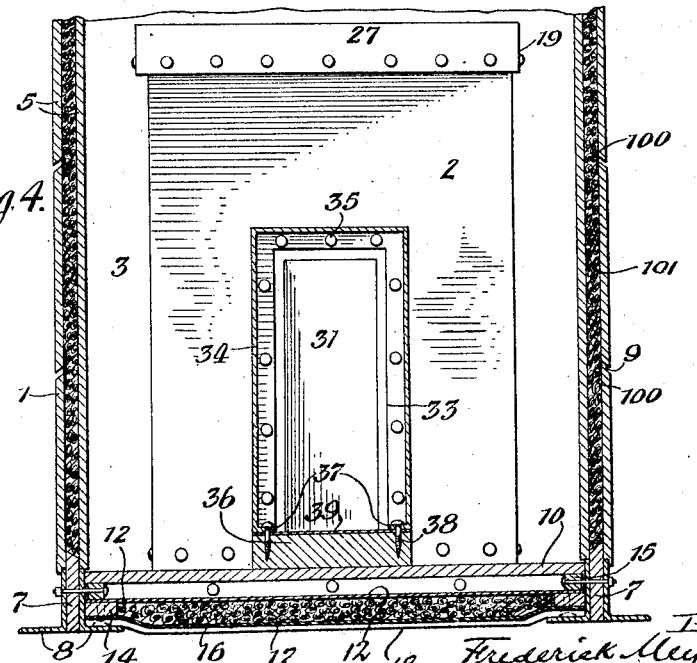

Patented May 19, 1925.

1,538,130

UNITED STATES PATENT OFFICE.

FREDERICK MEYER, OF BUFFALO, NEW YORK.

REFRIGERATING TANK.

Application filed October 19, 1922. Serial No. 595,667.

*To all whom it may concern:*

Be it known that I, FREDERICK MEYER, a citizen of the United States, residing in Buffalo, in the county of Erie and State of New York, have invented new and useful Improvements in Refrigerating Tanks, of which the following is a specification.

This invention relates to improvements in refrigerating tanks such as are used for transportation of ice cream by wagons or motor trucks.

Such tanks include an ice cream receptacle and an ice chamber surrounding the same and have been found seriously objectionable because of the great liability of the ice cream receptacles to become leaky and of the difficulty, if not impracticability, of making repairs or replacements.

The principal object of the present invention is to avoid these objections by providing a construction wherein the liability of the ice cream receptacle becoming leaky is greatly reduced, that is to say wherein the ice cream receptacle has a much longer efficient life, and wherein the ice cream receptacle may be readily removed from and replaced in the ice chamber for the purpose of repair or renewal.

Further objects are to maintain a lower temperature in the ice cream receptacle, to provide for substantially greater refrigerating area without increasing the size of the tank or of the ice cream receptacle, and to obtain regular and certain drainage of the brine.

With the above objects in view the invention consists generally in novel features of structure and combination which will be pointed out in detail as the description proceeds.

A refrigerating tank in which the features of the invention are incorporated is illustrated in the accompanying drawing, wherein.

Figure 2:
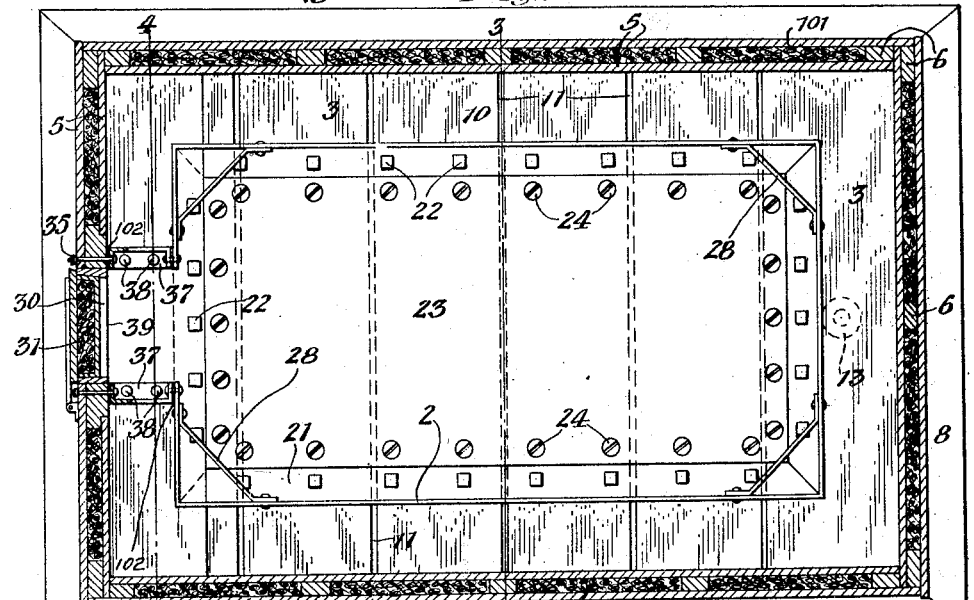
Figure 2 is a section on the line 2—2, of Fig. 1.

Figures 3 and 4 are cross sections on lines 3—3 and 4—4, Fig. 2.

Similar characters of reference refer to like parts throughout the several views.

The tank includes an outer casing as 1, an enclosed ice cream receptacle 2, and an ice chamber 3 intermediate the casing 1 and the receptacle 2.

The casing 1 is provided with a removable top 4 which forms a cover for the ice chamber 3. The vertical walls of the casing 1 are suitably constructed, according to standard practice, to provide heat insulation and may, as shown, consist of inner and outer wooden shells 5 having a dead air space between them which is filled with suitable heat insulating material 101 such as cork. The shells 5 are connected to the framework 6 which may be of any suitable construction and which includes a rectangular frame 7, projecting below the vertical walls and secured between the inner and outer angle bar supports 8, these extending adjacent the four vertical walls of the casing 1. The outer of the shells 5 is preferably constructed to compensate for expansion and contraction, for this purpose being made in sections which are suitably spaced from one another as at 9, these spaces being backed by closure strips 100 of copper or otherwise suitably occluded to the space between the shells.

Figure 1:
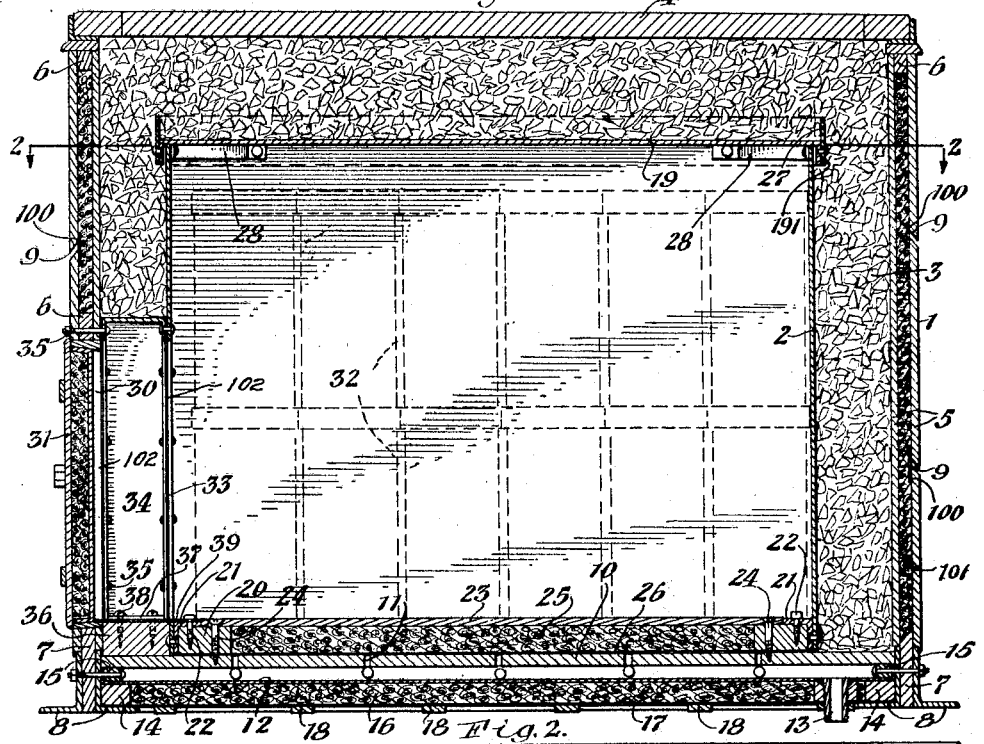
Figure 1 is a vertical longitudinal sectional view.

The ice chamber 3 is provided with a bottom 10 which is constructed to provide for the free drainage of the brine and for this purpose is preferably slatted, the brine draining through the spaces 11 between the slats. A drip pan 12 is supported below the bottom 10 and is provided at one end with an outlet nipple 13 through which the brine escapes. The pan 12 rests upon a supporting frame 14 carried by the inner beams 8 and may be secured by a frame 15 connected by bolt and nut fastenings to the outer beams 8, the bars of the frame 15 bearing against the vertical walls or flanges of the pan 12. A layer of heat insulating material 16, such as cork, is arranged below and against the pan 12, being held in place by a retaining sheet 17, preferably of felt paper or roofing material, the edges of which are secured to the frame 14. The layer 16 is supported on its underside by slats 18 resting at their ends on the horizontal flanges of the inner beams 8, as shown in Figures 1, 3 and 4.

The bottom 10 rests upon the frame 15 as a support and is utilized for the support of the ice cream receptacle 2. Said receptacle consists of four vertical walls, preferably of steel, and a removable cover 19, said walls and cover being suitably spaced from the walls and cover of the casing 1 to provide the ice chamber 3. The vertical walls of the ice cream receptacle are fastened to a securing frame 20 in turn fastened to the bottom 10. For this purpose angle irons 21 are preferably secured at the inner sides of said vertical walls and adjacent their lower edges, thereby providing flanges which rest upon the bars of the frame 20 and are secured thereto, as by screws 22. The ice cream receptacle is completed by a floor plate 23 which rests upon the frame 20 and is secured by screws 24, these being preferably utilized to secure said frame to the bottom 10. A layer of heat insulating material 25, such as cork, is arranged below and against the plate 23 and is preferably confined by a retaining sheet 26, preferably of felt paper or roofing material, which rests upon the bottom 10, occluding the spaces 11 in said bottom to the space in which the material 25 is arranged. The cover 19 is preferably formed with a depending flange 191 which extends adjacent each edge and which serves to center said cover upon the vertical walls 2. Said cover is also preferably provided with an upwardly directed flange 27 which extends adjacent each edge and which may consist of a rectangular frame suitably secured to said depending flange 191. The flange 27 causes said cover to serve as a pan for the retention of a certain amount of brine, thereby to maintain a lower temperature in the ice cream receptacle than can be secured in the constructions heretofore known. The vertical walls of the receptacle 2 are preferably reinforced at or near the top of said receptacle by diagonal braces 28.

The casing 1 is formed in its rear wall with a door opening 30 which is normally closed by a hinged door 31 of usual construction and by which access is had to the receptacle 2 for the purpose of removing the ice cream containers 32 indicated by broken lines. The receptacle 2 is formed with an opening 33 which alines with the opening 30 and is provided with an extension 34 which frames the openings 33 and 30 and provides a passageway through which the containers 32 may be removed. The extension 34 includes two side bars and an upper bar which are preferably of channel cross-section with their flanges inwardly directed. Said extension is secured, preferably by rivets, to the rear wall of the receptacle 2, and is preferably removably secured to the casing 1 as by bolt and nut fastenings 35 which are externally and internally accessible. The frame provided by the extension 34 is completed by a sill member 36 which rests upon the bottom 10. The side bars of the extension 34 are provided at their lower ends with inturned flanges 37 to which the member 36 is secured, as by screws 38. A wear plate 39 preferably overlies the member 36 and is secured by the screws 22 to the adjacent angle iron 21.

The advantages of the tank may be briefly summarized as follows: The floor 10 insures perfect automatic drainage from the ice chamber 3 and thereby prevents any accumulation of brine in the ice chamber, and resultant injury to the ice cream receptacle 2. The pan provided by the cover 19 collects a certain amount of brine above the ice cream receptacle which is of uniform depth and effective in maintaining a lower temperature in said receptacle. Since the vertical walls of the ice cream receptacle are all spaced from the casing 1 said receptacle has greater refrigerating area than in the constructions heretofore employed where one of the vertical walls of the ice cream receptacle is directly attached to a wall of the casing. The extension 34 insures a perfect water tight connection adjacent the door opening and permits using an ice chamber of greater capacity and in which the freezing mixture is confined in relation to each wall of the ice cream receptacle. The ice cream receptacle may be readily removed for the purpose of repair or replacement, all fastenings thereof being easily accessible and its removal or replacement in no way affecting or impairing the rest of the structure of the tank. The removal of the ice cream receptacle may be effected simply by disconnecting the fastenings 22 and 35 and lifting the ice cream receptacle from the ice chamber.

In order to produce a water tight or leak proof joint between the frame extension 34 and the refrigerating chamber and the casing packing strips 102, 102 of rubber or other suitable material are clamped between the front and rear flanges of the extension 34 and the casing and front wall of the refrigerating chamber, as shown in Figs. 1 and 2.

Having fully described my invention I claim:

1. A refrigerating tank comprising a casing, an ice cream receptacle enclosed therein, an ice chamber being formed by the walls of said casing and receptacle, said ice chamber having a perforate bottom which provides support for said receptacle, a supporting element secured to said casing, a drip pan arranged below said bottom, and a frame secured to said supporting element and serving for the attachment of said drip pan and the support of said bottom.

2. A refrigerating tank comprising a casing, an ice cream receptacle enclosed therein, an ice chamber being formed by the walls of said casing and receptacle, said ice chamber having a perforate bottom which provides support for said receptacle, the latter being removably secured to said bottom, a floor for said receptacle also secured to said bottom, said floor being spaced from said bottom, and insulating material in the space between said floor and said bottom.

3. A refrigerating tank comprising an enclosing casing having a side wall, a cover engaging said side wall, an angle iron arranged at the lower edge of said side wall and provided with an inwardly turned lower flange, a slotted bottom surrounded by said angle iron, a wood frame arranged above said slotted bottom, a tight bottom arranged above said frame, an angle iron frame having an upper horizontal flange engaging with the top of said wood frame and a lower vertical flange engaging the outer side of said wood frame, an upright receptacle wall secured at its lower edge to the outer side of said vertical flange, and a cover engaging said receptacle wall.

4. A refrigerating tank comprising an enclosing casing having a side wall, a cover engaging said side wall, an angle iron arranged at the lower edge of said side wall and provided with an inwardly turned lower flange, a slotted bottom surrounded by said angle iron, a wood frame arranged above said slotted bottom, a tight bottom arranged above said frame, an angle iron frame having an upper horizontal flange engaging with the top of said wood frame and a lower vertical flange engaging the outer side of said wood frame, an upright receptacle wall secured at its lower edge to the outer side of said vertical flange, and a cover engaging said receptacle wall and having a horizontal plate body; a depending marginal flange surrounding the wall of said receptacle, and an upstanding flange arranged on the marginal part of said plate body.

5. A refrigerating tank comprising an enclosing casing having a side wall, a cover engaging said side wall, an angle iron arranged at the lower edge of said side wall and provided with an inwardly turned lower flange, a slotted bottom surrounded by said angle iron, a wood frame arranged above said slotted bottom, a tight bottom arranged above said frame, an angle iron frame having an upper horizontal flange engaging with the top of said wood frame and a lower vertical flange engaging the outer side of said wood frame, an upright receptacle wall secured at its lower edge to the outer side of said vertical flange, a heat insulating filling arranged below said tight bottom, a felt paper lining arranged between said insulating filling and said slotted bottom, and a cover engaging said receptacle wall.

6. A refrigerating tank comprising an enclosing casing having a side wall, a cover engaging said side wall, an angle iron arranged at the lower edge of said side wall and provided with an inwardly turned lower flange, a slotted bottom surrounded by said angle iron, a wood frame arranged above said slotted bottom, a tight bottom arranged above said frame, a receptacle arranged above the slotted bottom, a pan arranged below the slotted bottom and provided with an upstanding marginal flange which engages with the inner side of said angle iron, and a wood support engaging with the inner side of the flange on said pan.

7. A refrigerating tank comprising an enclosing casing having a side wall, a cover engaging said side wall, an angle iron arranged at the lower edge of said side wall and provided with an inwardly turned lower flange, a slotted bottom surrounded by said angle iron, a wood frame arranged above said slotted bottom, a tight bottom arranged above said frame, a receptacle arranged above the slotted bottom, a pan arranged below the slotted bottom and provided with an upstanding marginal flange which engages with the inner side of said angle iron, a wood support engaging with the inner side of the flange on said pan, a wood frame arranged below said pan and resting against said angle iron frame, an insulating filling arranged below said pan, a felt paper lining arranged below said insulating filling, and slats engaging the underside of said lining and mounted at their ends on said angle iron frame.

FREDERICK MEYER.